(12) United States Patent  
Gao

(10) Patent No.: US 8,586,260 B2  
(45) Date of Patent: Nov. 19, 2013

(54) FUEL CELL WITH MULTIPLE INDEPENDENT REACTION REGIONS

(76) Inventor: Yong Gao, Shanghai (CN)

(\*) Notice: Subject to any disclaimer, the term of this patent is extended or adjusted under 35 U.S.C. 154(b) by 0 days.

(21) Appl. No.: 13/638,614

(22) PCT Filed: Mar. 29, 2011

(86) PCT No.: PCT/CN2011/072269  
§ 371 (c)(1),  
(2), (4) Date: Sep. 30, 2012

(87) PCT Pub. No.: WO2011/120425  
PCT Pub. Date: Oct. 6, 2011

(65) Prior Publication Data  
US 2013/0029244 A1   Jan. 31, 2013

(30) Foreign Application Priority Data

Mar. 30, 2010  (CN) .......................... 2010 1 0136269

(51) Int. Cl.  
*H01M 8/10* (2006.01)
(52) U.S. Cl.  
USPC ........... 429/492; 429/518; 429/457; 429/452; 429/453; 429/480; 429/482; 429/483
(58) Field of Classification Search  
None  
See application file for complete search history.

(56) References Cited

U.S. PATENT DOCUMENTS

| | | | |
|---|---|---|---|
| 5,989,741 A * | 11/1999 | Bloomfield et al. | 429/465 |
| 6,916,573 B2 * | 7/2005 | Trabold et al. | 429/483 |
| 2004/0053100 A1 * | 3/2004 | Stanley et al. | 429/30 |
| 2005/0130023 A1 * | 6/2005 | Lebowitz et al. | 429/41 |
| 2007/0009780 A1 * | 1/2007 | Smith | 429/35 |

\* cited by examiner

*Primary Examiner* — Nicholas P D'Aniello  
*Assistant Examiner* — Carmen Lyles-Irving  
(74) *Attorney, Agent, or Firm* — Han IP Corporation

(57) ABSTRACT

A fuel cell with multiple independent reaction regions comprises multiple fuel cell units. Each fuel cell unit comprises bipolar plates and a membrane electrode assembly located between the bipolar plates. The membrane electrode assembly comprises a proton exchange membrane and catalyst layers located at both sides of the proton exchange membrane, and the catalyst layers at least at one side of the proton exchange membrane are formed with multiple mutually independent catalyst sublayers. Different from the prior design concepts of striving to distribute reactants as uniformly as possible in the whole reaction area, the whole cell in this invention is divided into multiple independent reaction regions, and relevance of the reaction regions is eliminated. Therefore, by partitioning and reducing the amplitude of possible voltage difference, this invention is able to reduce electrochemical corrosion and maximize performance of each independent region and the whole fuel cell.

15 Claims, 6 Drawing Sheets

FUEL CELL WITH MULTIPLE INDEPENDENT REACTION REGIONS

CROSS-REFERENCE TO RELATED APPLICATION

This application is the U.S. national stage application of International Application No. PCT/CN2011/072269, filed on Mar. 29, 2011, which claims the priority benefit of Chinese Patent Application No. 201010136269.4, filed on Mar. 30, 2010. The above-identified patent applications are hereby incorporated by reference.

TECHNICAL FIELD

This invention belongs to the technical field of fuel cell, more particularly to the design of reaction regions of fuel cell.

BACKGROUND

Fuel cell is typically composed of a plurality of single cells with each comprising two electrodes (bipolar plates) which are divided apart by an electrolyte element and assembled with each other in series to form a fuel cell stack. Electrochemical reaction is implemented by supplying proper reactants to each electrode, i.e., supplying fuel to one electrode and oxidant to the other electrode, as a result, potential difference is formed between the electrodes and accordingly, electric energy is generated.

To meet the demand of large-power output, increasing active area (catalyst layers) in membrane electrode assembly (MEA) of each cell is typically applied. As shown in FIG. 1, catalyst layers 2 are arranged at two sides (only the front side is shown in FIG. 1) of a proton exchange membrane 1 in FIG. 1, reactants entering channels of the bipolar plate from passages 4, and reactants released from the channels start electrochemical reaction on the catalyst layers 2 of the membrane electrode assembly (MEA).

In comparison with previous techniques, considerable improvements have been made in channel designs of the present bipolar plates although channels on the bipolar plate are still unable to guarantee the uniform conveyance of reactants during the process of electrochemical reaction, along with increase of active areas in the membrane electrode assembly (MEA). In the membrane electrode assembly (MEA), shown as FIG. 1, gas flow distribution is not uniform along channels of entire cell from entrance to exit, or in different local regions. In addition, for overall areas or local regions, concentration of fuel and oxidant are also uneven, and during working state, electrical transient effect generated by the fluctuation of reactants supply, and the relation between voltage V and length L from channel inlet to outlet are shown as FIG. 2. A fairly large voltage difference $\Delta V$ is possibly generated between two ends of the same channel with its length L; likewise, such a phenomenon of fairly large voltage difference could also be possibly generated in the transverse direction of the active areas of the membrane electrode assembly (MEA), and the generation of voltage difference caused by uneven delivery of reactants is also possible between the channels to generate a fairly large in-plane current inside each cell, as a result, electrochemical corrosion of membrane electrode is caused, and this will shorten the service life of fuel cell greatly. Further, performance of the regions with rich reactant supply is limited by the regions with poor reactant supply, such correlation effect will result in pulling down output voltage in the regions with rich reactant supply, so impact overall output power of the fuel cell.

SUMMARY

The objective of the invention is to provide a fuel cell with a plurality of independent reaction regions in order to solve the technical problem in the prior fuel cell design that each cell is liable to generate in-plane current to lead to the corrosion of the fuel cell.

In order to achieve the objective above, the following technical proposals are made in this invention:

A fuel cell with a plurality of independent reaction regions comprises a plurality of fuel cell units, each of said unit comprises bipolar plates and a membrane electrode assembly between the bipolar plates, said membrane electrode assembly comprises a proton exchange membrane and catalyst layers positioned on two sides of the proton exchange membrane, and catalyst layers at least on one side of said proton exchange membrane are formed with a plurality of mutually independent catalyst sublayers. Different from the prior design concept attempting to distribute reactants flows as evenly as possible throughout the whole active area, this invention divides each whole cell into a plurality of independent reaction regions, thus eliminating the correlation of the reaction regions, partitioning and reducing the amplitude of possible in-plane voltage difference, reducing electrochemical corrosion, improving performance of each independent region, and optimizing performance of the whole fuel cell.

Further, mutually independent catalyst sublayers are arranged at the two sides of the proton exchange membrane symmetrically.

Further, a gas diffusion layer is arranged in correspondence to the position of each of the catalyst sublayers.

Further, the bipolar plate comprises a non-electrochemical reaction region and a plurality of electrochemical reaction regions, the electrochemical reaction regions are corresponding to the catalyst sublayers in position, and the electrochemical reaction regions are jointly framed with the non-electrochemical reaction region.

Further, the non-electrochemical reaction region is made of a non-conductive material.

Further, a fuel cell unit is formed with membrane, catalyst sublayers, gas diffusion sublayers and bipolar plates sandwiched at same position, a plurality of said units stacked in series to form a fuel cell unit group, a plurality of said group connected in parallel to form a whole fuel cell.

Further, a plurality of divided catalyst sublayers are arranged on the two sides of the proton exchange membrane symmetrically in transverse pattern.

Further, a plurality of divided catalyst sublayers are arranged on the two sides of the proton exchange membrane symmetrically in longitudinal pattern.

Further, insulating fillers are arranged around the catalyst sublayers and gas diffusion sublayers and in gaps between fuel cell units in one layer.

Further, the fillers are structurally integrated with the non-electrochemical reaction region.

In this invention, the catalyst sublayers in the membrane electrode assembly of fuel cell are designed as a plurality of independent regions, and further, the gas diffusion layers, the bipolar plates and the like are divided correspondingly in the design, thus the generation of large in-plane current on the catalyst layers, gas diffusion layers and bipolar plates can be effectively minimized, so corrosion of the fuel cell is effectively reduced, and the service life of the fuel cell is improved.

Performance of each independent region, further the whole fuel cell is improved to the maximum extent.

Further description is made below for this invention with reference to the drawings and the embodiments.

DETAILED DESCRIPTION OF SAMPLE EMBODIMENTS

Figure 5:
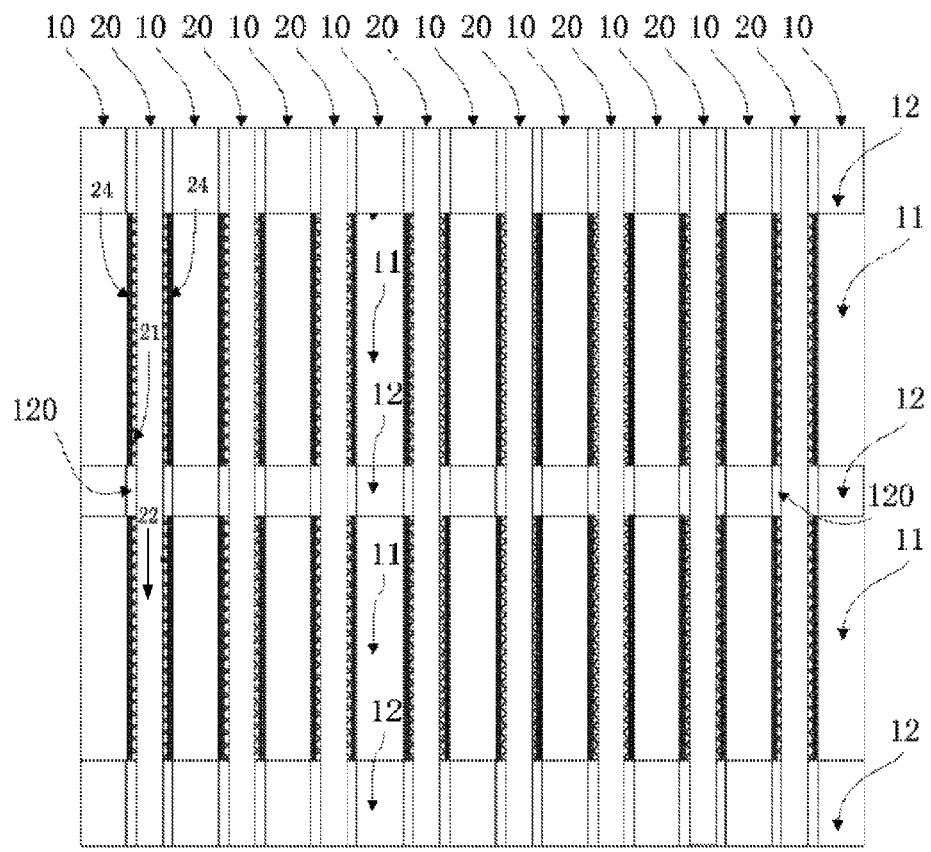
FIG. 5 is an A-A sectional view of the membrane electrode assembly in FIG. 3 in the embodiment of the fuel cell of this invention.

As shown in FIG. 5, a fuel cell with a plurality of independent reaction regions comprises a plurality of fuel cell units, each fuel cell unit comprises bipolar plates 10 and a membrane electrode assembly 20 between the bipolar plates 10, the membrane electrode assembly 20 comprises a proton exchange membrane 22 and catalyst layers 21 positioned on two sides of the proton exchange membrane, wherein the catalyst layers 21 on one side of the proton exchange membrane 22 at least are formed a plurality of mutually independent catalyst sublayers 21. That is to say, one whole piece of catalyst layer 21 is divided into a plurality of mutually independent smaller pieces called sublayers. Therefore, the generation of a possibly large in-plane current on the catalyst layer 21 is minimized in comparison with the prior single piece of catalyst layer 21.

Different from the current design concept in which efforts are made to distribute reactant in the whole reaction region as evenly as possible, this invention divides the whole cell into a plurality of independent reaction regions, thus eliminating the correlation of the reaction regions, partitioning and reducing the amplitude of possible in plane voltage difference, reducing electrochemical corrosion of membrane electrodes, and improving the performance of each independent region, further optimizing performance of the whole fuel cell to the maximum extent.

Wherein, catalyst sublayers 21 are arranged on the two sides of the proton exchange membrane 22 symmetrically.

Wherein, a gas diffusion layer (GDL) 24 is arranged in correspondence to the position of each of the catalyst sublayers 21. That is to say, the GDL 24, similar to the catalyst sublayers 21, is also divided into a plurality of smaller pieces GDLs 24. In this way, the generation of in-plane current on the GDLs 24 can be minimized as well.

Wherein, each of the bipolar plates 10 comprises a non-electrochemical reaction region 12 and a plurality of electrochemical reaction regions 11, the electrochemical reaction regions 11 are corresponding to the catalyst sublayers 21 in position, and the electrochemical reaction regions 11 are jointly framed with the non-electrochemical reaction region 12.

Wherein, the non-electrochemical reaction region 12 is made of a non-conductive material.

Wherein, shown as FIG. 5, a fuel cell unit is formed with membrane 22, catalyst sublayers 21, gas diffusion sublayers 24 and bipolar plates 10 sandwiched at same position, a plurality of said units stacked in series to form a fuel cell unit group, a plurality of said group connected in parallel to form a whole fuel cell. The fuel cell units are independent of each other and no in-plane current is generated among the units, so the service life of fuel cell can be effectively prolonged.

Figure 1:
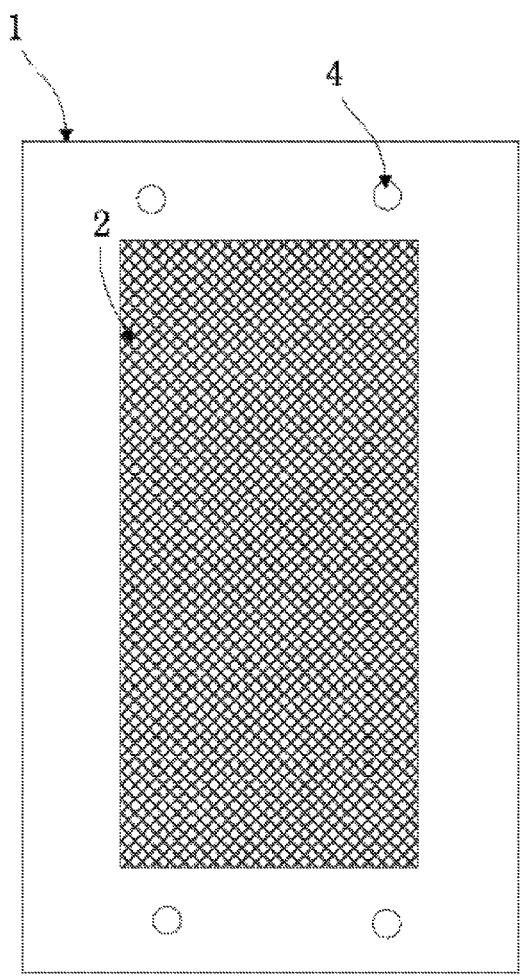
FIG. 1 is a structural schematic diagram of the membrane electrode assembly of the current fuel cell.
Figure 2:
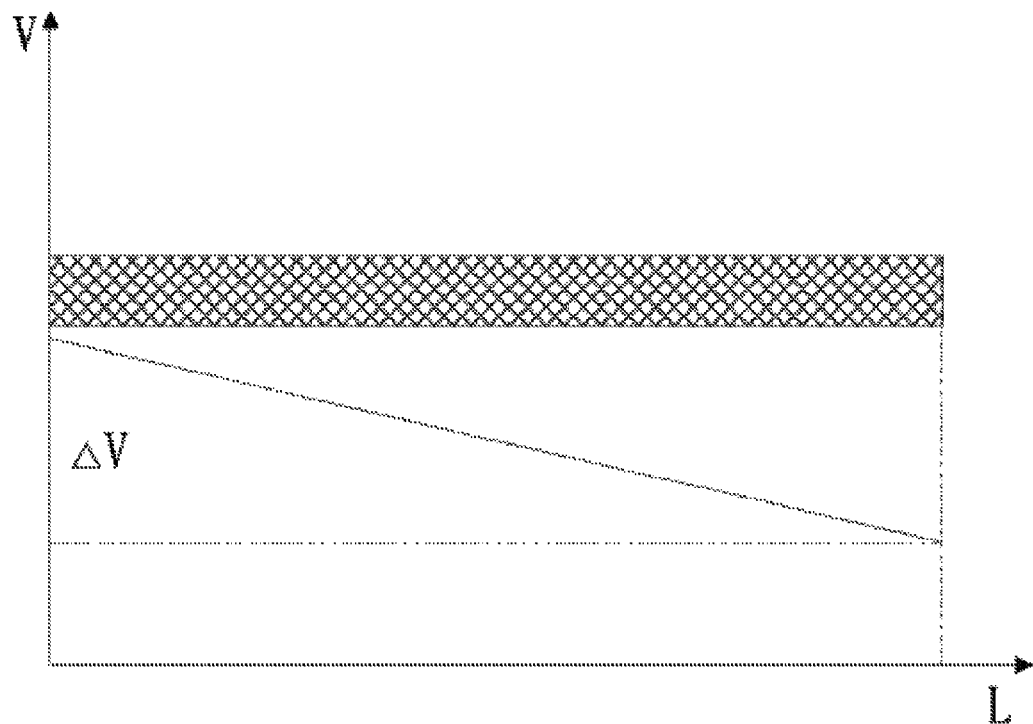
FIG. 2 is a relation graph of voltage V of the membrane electrode assembly of the current fuel cell on the same channel length L.
Figure 3:
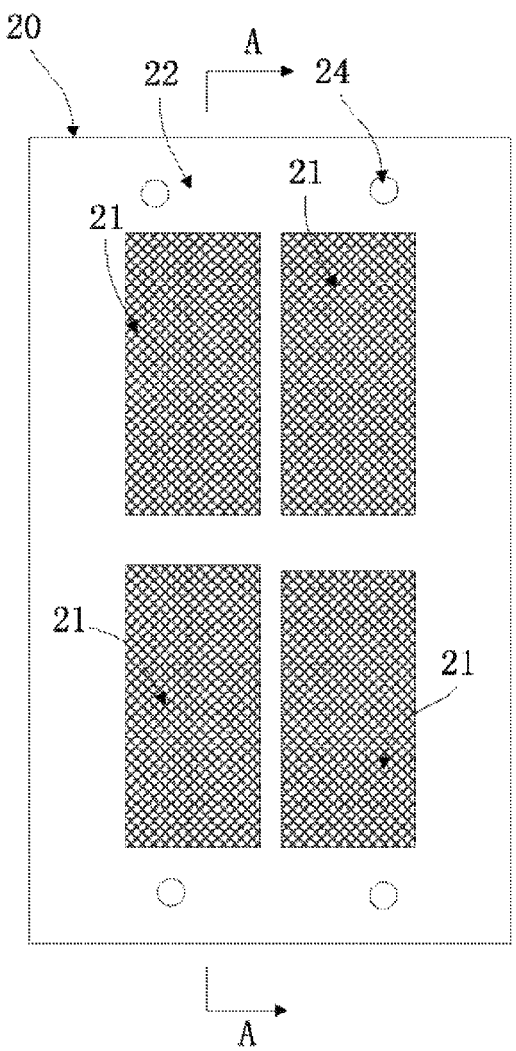
FIG. 3 is a structural schematic diagram of the membrane electrode assembly in the embodiment of the fuel cell of the invention.
Figure 4:
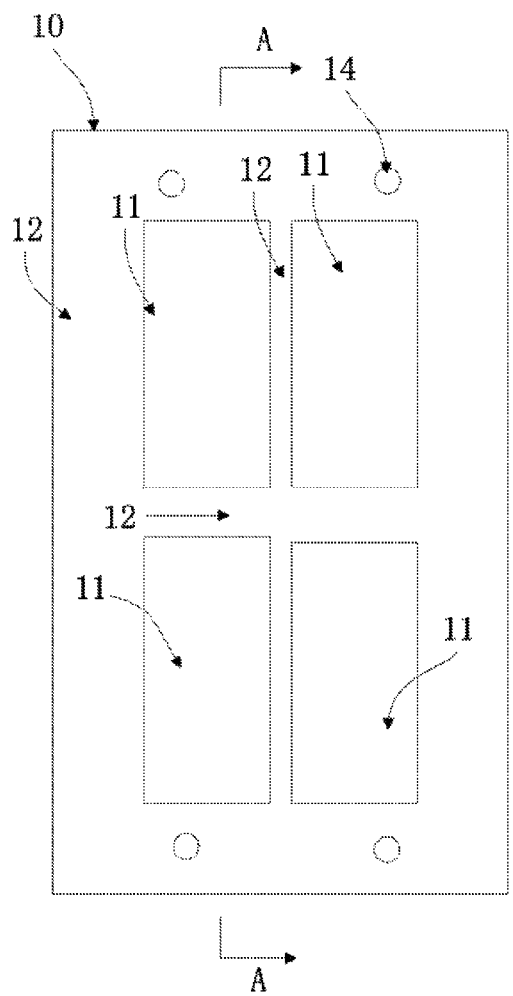
FIG. 4 is a structural schematic diagram of the bipolar plate in the embodiment of the fuel cell of the invention.
Figure 6:
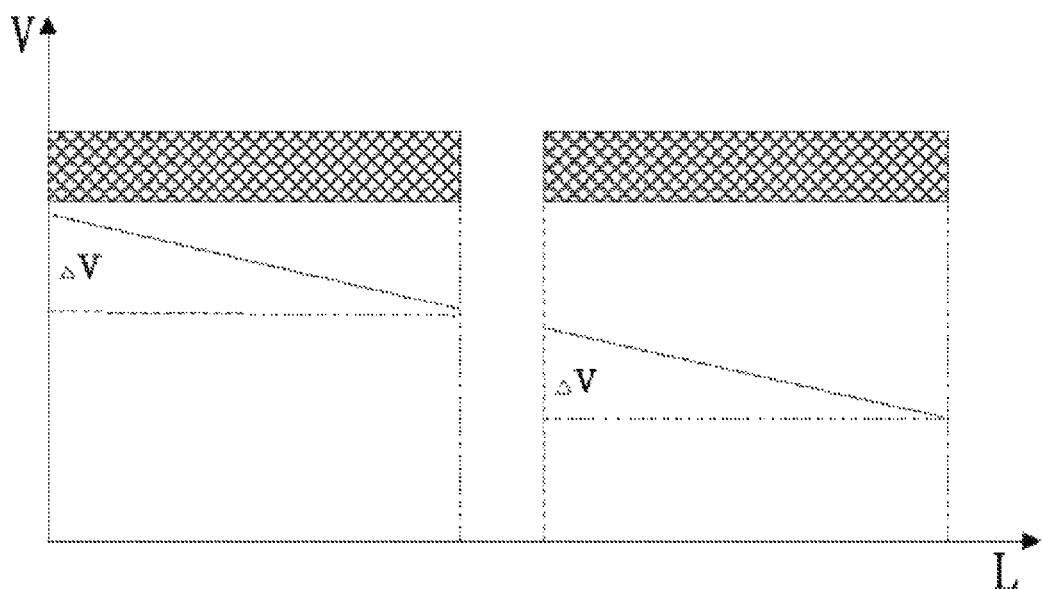
FIG. 6 is a relation graph of in-plane voltage V of the membrane electrode assembly in the embodiment of the fuel cell of this invention versus in-plane channel length L.

Thus, a large voltage difference will not be formed even when transient effect occurs on the same unit owing to uneven reactant flows in the channels. Due to uneven distribution of reactant flows along the channels on the membrane electrode assembly 20, while transient effect is generated, the relation between voltage V and length L along the same channels is shown as FIG. 6. Through dividing catalyst layer 21 into a plurality of independent regions along the same channel with length L, under the same flow field condition, a voltage difference ΔV possibly generated between two ends of the channel is merely a fraction of the one in prior art design (the specific ΔV value depends on the number of the catalyst sublayers 21 along the channel), so that amplitude of voltage or current change along flow field in reduced remarkably. The reaction regions are capable of delivering better performance since they are independent and do not affect each other. Likewise, the voltage difference generated along the transverse direction of the reaction regions 21 is also merely a fraction of the one along with MEA designed in previous (the specific value depends on the number of the catalyst sublayers 21 on across channels transversely), which reduces in-plane current generated inside each fuel cell unit remarkably, and by restricting the generated in-plane current within the individual fuel cell unit, the corrosion of entire fuel cell is minimized, and the service life of fuel cell is greatly prolonged. In FIG. 3, a passage port 14 is connected with a passage (shown in FIG. 4) on the corresponding bipolar plate 10.

Wherein, it is flexible to design the number of the catalyst sublayers 21, such as from 2 to 200, and there are a number of ways to layout catalyst sublayers. A preferable design layout is to arrange catalyst sublayers as evenly as possible, so the area utilization of membrane electrode assembly is optimized as much as possible without sacrificing its performance. For example, a plurality of catalyst sublayers 21 are arranged on the two sides of the proton exchange membrane 22 symmetrically and transversely, and/or a plurality of catalyst sublayers 21 are arranged on the two sides of the proton exchange membrane 22 symmetrically and longitudinally.

Description is made based upon four catalyst sublayers 21 in this embodiment, and it shall be understood that the invention is not limited by this embodiment.

FIG. 5 is an A-A sectional view of the membrane electrode assembly in FIG. 3 after fuel cell is assembled. In the figure, insulating fillers 120 are arranged in gaps between the catalyst sublayers 21 in the same fuel cell unit and gaps between GDLs 24. The filler 120 is used for filling the gaps as well as for insulating communication of the catalyst sublayers 21 and insulation of the GDLs 24. The filler 120 may also be a part of the non-electrochemical reaction region 12 of the bipolar plate 10, i.e., the filler 120 is structurally integrated with the non-electrochemical reaction region 12. This could simplify the processing and assembly of fuel cell.

Wherein, the electrochemical reaction region 11 of the bipolar plate 10 is a region where fuel supplied reacts with oxidant, and the non-electrochemical reaction region 12 is a region where no electrochemical reaction occurs. The non-electrochemical reaction region 12 is used for supporting the electrochemical reaction region 11 and withstanding external mechanized compress on. The electrochemical reaction regions 11 and the non-electrochemical reaction region 12 of the bipolar plate are divided in design, which could reduce design difficulty. For example, the material for the bipolar plate in the electrochemical reaction region 11 may be materials that meet the demands of the bipolar plate for fuel cell, e.g., carbon plate, metal plate and the like. And the material for the bipolar plate in the non-electrochemical reaction region 12 may be materials with certain strength and heat resistance, low cost and easy machining and formation, and the electrochemical reaction region 11 is jointly framed in the non-electrochemical reaction region 12 during assembly.

Wherein, the non-electrochemical reaction region 12 is made of a non-conductive material, such as ABS (styrene-butadiene-acrylonitrile-based ternary copolymer), PVC (polyvinyl chloride) and other materials. The non-electrochemical reaction region 12 can either be structurally integrated, or be formed by jointing multiple pieces. In the prior bipolar plates for fuel cell, both the reaction region and the non-reaction region at the periphery thereof are made of the same or similar conductive material, causing that a part of current generated by reaction passes through the non-reaction region at the periphery of the reaction region to form eddy current, as a result, gradient deviation of current and loss of current could be caused, and this disadvantageous current distribution is possibly liable to result in the shortening of the service life of fuel cell stack. According to this invention, the electrochemical reaction region 11 and the non-electrochemical reaction region 12 of the bipolar plate are separated in design and insulating materials are used for fabrication of the non-electrochemical reaction region 12, so current could pass through the electrochemical reaction region 11 only and uniformly to avoid the generation of eddy current. As a result, the service life of the fuel cell is improved. In addition, the non-electrochemical reaction region 12 is made of an insulating material, so such a connection way could further avoid generation of in-plane current.

Wherein, the electrochemical reaction region 11 is located in center, and the non-electrochemical reaction region 12 is located on the periphery of the electrochemical reaction region 11.

Wherein, the non-electrochemical reaction region 12 is provided with a passage port 14 connected to channels of the non-electrochemical reaction region 12. This may be achieved by a number of techniques in prior art of bipolar plate designs, so detailed description regarding this part is herein omitted.

Wherein, the joint between the electrochemical reaction region 11 and the non-electrochemical reaction region 12 may be achieved in a number of approaches, such as jointing subsequent to adhesion, hot pressing and extrusion, or the jointed part is in a particular shape, such as step, saw tooth, groove and protrusion, in addition, the joint can also be achieved by many other ways, such as using annular sealing strips to frame together.

The embodiment discussed above is merely for describing the technical concepts and features of this invention, the objectives are that those skilled in this art could understand the content of the invention and implement therefrom, limitation to the patent scope of the invention cannot be made only by this embodiment, that is to say, any equivalent variations or modifications in accordance with the spirit disclosed by the invention shall be contemplated as being within the patent scope of this invention.

What is claimed is:

1. A fuel cell with multiple independent reaction regions, comprising:
    a first bipolar plate having a plurality of first electrochemical reaction regions and a plurality of first non-electrochemical reaction regions, wherein every two adjacent first electrochemical reaction regions are separated by a respective one of the first non-electrochemical reaction regions;
    a second bipolar plate having a plurality of second electrochemical reaction regions and a plurality of second non-electrochemical reaction regions, wherein every two adjacent second electrochemical reaction regions are separated by a respective one of the second non-electrochemical reaction regions;
    a membrane electrode assembly disposed between the first and the second bipolar plates, comprising:
        a proton exchange membrane having a first side and a second side opposite to the first side,
        a plurality of first catalyst sublayers disposed on the first side of the proton exchange membrane and spaced apart with respect to each other, and
        a plurality of second catalyst sublayers disposed on the second side of the proton exchange membrane and spaced apart with respect to each other,
        a plurality of first gas diffusion sublayers, wherein each of the first gas diffusion sublayers is disposed on a respective one of the first catalyst sublayers, and
        a plurality of second gas diffusion sublayers, wherein each of the second gas diffusion sublayers is disposed on a respective one of the second catalyst sublayers;
    a plurality of first insulating fillers, wherein each of the first insulating fillers is disposed between respective two adjacent first catalyst sublayers;
    a plurality of second insulating fillers, wherein each of the second insulating fillers is disposed between respective two adjacent second catalyst sublayers;
    a plurality of third insulating fillers, wherein each of the third insulating fillers is disposed between respective two adjacent first gas diffusion sublayers; and
    a plurality of fourth insulating fillers, wherein each of the fourth insulating fillers is disposed between respective two adjacent second gas diffusion sublayers, wherein:
    each of the first catalyst sublayers corresponds to a respective one of the second catalyst sublayers,
    each of the first electrochemical reaction regions is disposed on a respective one of the first catalyst sublayers,
    each of the second electrochemical reaction regions is disposed on a respective one of the second catalyst sublayers,
    at least some of the first or the second non-electrochemical reaction regions are made of a non-conductive material selected from the group consisting of styrene-butadiene-acrylonitrile copolymers and polyvinyl chloride, and
    each of the first insulating fillers and a respective one of the third insulating fillers are structurally integrated with a respective one of the first non-electrochemical reaction regions, and wherein each of the second insulating fillers and a respective one of the fourth insulating fillers are structurally integrated with a respective one of the second non-electrochemical reaction regions.

2. A fuel cell with multiple independent reaction regions according to claim 1, wherein the first catalyst sublayers and the second catalyst sublayers are symmetrically disposed on the first side and the second side of the proton exchange membrane, respectively.

3. A fuel cell with multiple independent reaction regions according to claim 1, wherein two adjacent first electrochemical reaction regions are structurally integrated by a respective one of the first non-electrochemical reaction regions, and wherein two adjacent second electrochemical reaction regions are structurally integrated by a respective one of the second non-electrochemical reaction regions.

4. A fuel cell with multiple independent reaction regions according to claim 1, wherein a fuel cell unit is formed by the proton exchange membrane, one of the first catalyst sublayers, a respective one of the second catalyst sublayers, a respective one of the first gas diffusion sublayers, a respective one of the second gas diffusion sublayers, a respective one of the first electrochemical reaction regions of the first bipolar plate, and a respective one of the second electrochemical reaction regions of the second bipolar plates, wherein a plurality of the fuel cell units are stacked in series to form the fuel cell, and wherein a plurality of the fuel cell are connected in parallel to form a fuel cell stack.

5. A fuel cell with multiple independent reaction regions according to claim 2, wherein the first catalyst sublayers and the second catalyst sublayers are symmetrically disposed on the first side of the proton exchange membrane and the second side of the proton exchange membrane in a transverse pattern, respectively.

6. A fuel cell with multiple independent reaction regions according to claim 2, wherein the first catalyst sublayers and the second catalyst sublayers are symmetrically disposed on the first side of the proton exchange membrane and the second side of the proton exchange membrane in a longitudinal pattern, respectively.

7. A fuel cell with multiple independent reaction regions according to claim 1, wherein at least some of the first or the second electrochemical reaction regions are made of a conductive material selected from the group consisting of carbon and metal.

8. A fuel cell with multiple independent reaction regions, comprising:
   a membrane electrode assembly, comprising:
      a proton exchange membrane having a first side and a second side opposite to the first side,
         a plurality of first catalyst sublayers disposed on the first side of the proton exchange membrane and spaced apart with respect to each other,
         a plurality of second catalyst sublayers disposed on the second side of the proton exchange membrane and spaced apart with respect to each other,
         a plurality of first gas diffusion sublayers, wherein each of the first gas diffusion sublayers is disposed on a respective one of the first catalyst sublayers,
         a plurality of second gas diffusion sublayers, wherein each of the second gas diffusion sublayers is disposed on a respective one of the second catalyst sublayers,
         a plurality of first insulating fillers, wherein each of the first insulting fillers is disposed between respective two adjacent first catalyst sublayers,
         a plurality of second insulating fillers, wherein each of the second insulating fillers is disposed between respective two adjacent second catalyst sublayers,
         a plurality of third insulating fillers, wherein each of the third insulating fillers is disposed between respective two adjacent first gas diffusion sublayers, and
         a plurality of fourth insulating fillers, wherein each of the fourth insulating fillers is disposed between respective two adjacent second gas diffusion sublayers;
   a first bipolar plate having a plurality of first electrochemical reaction regions and a plurality of first non-electrochemical reaction regions, wherein each of the first electrochemical reaction regions is disposed on a respective one of the first gas diffusion sublayers and each of the first non-electrochemical reaction regions is disposed on a respective one of the third insulating fillers; and
   a second bipolar plate having a plurality of second electrochemical reaction regions and a plurality of second non-electrochemical reaction regions, wherein each of the second electrochemical reaction regions is disposed on a respective one of the second gas diffusion sublayers and each of the second non-electrochemical reaction regions is disposed on a respective one of the fourth insulating fillers, wherein:
      each of the first insulating fillers and a respective one of the third insulating fillers are structurally integrated with a respective one of the first non-electrochemical reaction regions, and wherein each of the second insulating fillers and a respective one of the fourth insulating fillers are structurally integrated with a respective one of the second non-electrochemical reaction regions, and
      at least some of the first or the second non-electrochemical reaction regions are made of a non-conductive material selected from the group consisting of styrene-butadiene-acrylonitrile copolymer and polyvinyl chloride.

9. A fuel cell with multiple independent reaction regions according to claim 8, wherein the first catalyst sublayers and the second catalyst sublayers are symmetrically disposed on the first side and the second side of the proton exchange membrane, respectively.

10. A fuel cell with multiple independent reaction regions according to claim 9, wherein the first catalyst sublayers and the second catalyst sublayers are symmetrically disposed on the first side of the proton exchange membrane and the second side of the proton exchange membrane in a transverse pattern, respectively.

11. A fuel cell with multiple independent reaction regions according to claim 9, wherein the first catalyst sublayers and the second catalyst sublayers are symmetrically disposed on the first side of the proton exchange membrane and the second side of the proton exchange membrane in a longitudinal pattern, respectively.

12. A fuel cell with multiple independent reaction regions according to claim 8, wherein two adjacent first electrochemical reaction regions are structurally integrated by a respective one of the first non-electrochemical reaction regions, and wherein two adjacent second electrochemical reaction regions are structurally integrated by a respective one of the second non-electrochemical reaction regions.

13. A fuel cell with multiple independent reaction regions according to claim 8, wherein one of the first non-electrochemical reaction regions, a respective one of the third insulating fillers, and a respective one of the first insulating fillers are formed integrally, and wherein one of the second non-electrochemical reaction regions, a respective one of the fourth insulating fillers, and a respective one of the second insulating fillers are formed integrally.

14. A fuel cell with multiple independent reaction regions according to claim 8, wherein at least some of the first or the second electrochemical reaction regions are made of a conductive material selected from the group consisting of carbon and metal.

15. A fuel cell stack, comprising a plurality of fuel cells of claim 8 connected in parallel.

\* \* \* \* \*